(12) United States Patent
Fan Chiang

(10) Patent No.: US 11,822,218 B2
(45) Date of Patent: Nov. 21, 2023

(54) PROJECTION SYSTEM HAVING PHASE MODULATOR

(71) Applicant: Himax Display, Inc., Tainan (TW)

(72) Inventor: Kuan-Hsu Fan Chiang, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 17/645,058

(22) Filed: Dec. 20, 2021

(65) Prior Publication Data

US 2023/0194963 A1    Jun. 22, 2023

(51) Int. Cl.
*G03B 21/00*    (2006.01)
*H04N 9/31*    (2006.01)
*G03B 21/20*    (2006.01)

(52) U.S. Cl.
CPC ....... *G03B 21/006* (2013.01); *G03B 21/2066* (2013.01); *H04N 9/3141* (2013.01)

(58) Field of Classification Search
CPC . G03B 21/006; G03B 21/2066; H04N 9/3141
See application file for complete search history.

(56) References Cited

U.S. PATENT DOCUMENTS

| | | | |
|---|---|---|---|
| 7,551,341 | B1 | 6/2009 | Ward et al. |
| 10,003,776 | B2 * | 6/2018 | Damberg ............... G02B 27/50 |
| 10,404,957 | B2 * | 9/2019 | Damberg ............. H04N 9/3161 |
| 2015/0003035 | A1 * | 1/2015 | Li ........................ G02B 6/0035 |
| | | | 362/617 |
| 2017/0374327 | A1 * | 12/2017 | Ouderkirk .......... G02B 27/0172 |
| 2020/0014895 | A1 * | 1/2020 | Damberg ............. H04N 9/3155 |
| 2021/0092337 | A1 | 3/2021 | Damberg et al. |
| 2021/0208391 | A1 * | 7/2021 | Fan-Chiang ........... G03B 21/62 |

\* cited by examiner

*Primary Examiner* — Magda Cruz
(74) *Attorney, Agent, or Firm* — CKC & Partners Co., LLC

(57) ABSTRACT

A projection system includes a light source, a reflective phase modulator, a display and a projection lens. The light source is configured to emit a first light. The reflective phase modulator is configured to modulate phase of the first light to form a second light. The display is configured to receive the second light. The display is located between the projection lens and the reflective phase modulator.

6 Claims, 3 Drawing Sheets

PROJECTION SYSTEM HAVING PHASE MODULATOR

BACKGROUND

Field of Invention

The present invention relates to a projection system.

Description of Related Art

In current projection systems, a light source emits a global light as an incident light of a display. However, it is difficult to eliminate or reduce contributions from the diffracted lights in darker regions of the images. As a result, image contrast is limited, especially for a complex image or fast changing images through time.

In addition, when the global light is a broadband light, optical elements for color separation are required to produce different colors in the images. As a result, light intensity loss may occur due to optical elements arranged between the light source and the display for color separation.

Accordingly, it is still a development direction for the industry to provide a projection system which can solve the aforementioned problems.

SUMMARY

The invention provides a projection system.

In some embodiments, the projection system includes a light source, a reflective phase modulator, a display and a projection lens. The light source is configured to emit a first light. The reflective phase modulator is configured to modulate phase of the first light to form a second light. The display is configured to receive the second light. The display is located between the projection lens and the reflective phase modulator.

In some embodiments, the reflective phase modulator is a LCOS-SLM.

In some embodiments, the second light comprises a plurality of local dim beams and a plurality of local bright beams.

In some embodiments, the display is a micro-display.

In some embodiments, the display is a LCOS display.

The invention provides a projection system.

In some embodiments, the projection system includes a light source module configured to provide an incident light, a computing unit, and a micro-display. The light source module includes a light source configured to emit a first light, and a LCOS-SLM configured to modulate phase of the first light to form the incident light. The incident light includes a plurality of local dim beams and a plurality of local bright beams. The computing unit is configured to control the light intensity of the local dim beams and the local bright beams of the incident light. The micro-display is configured to receive the incident light.

In the aforementioned embodiments, since the incident light of a display is modulated by a reflective phase modulator, the incident light can be redistributed to form local bright beams and local dim beams. As such, less diffracted light would propagate to a darker region of the image shown by the display. Therefore, image contrast can be improved. Since the reflective phase modulator is a reflective type device, phase modulation rate of the reflective phase modulator is higher. As such, the light intensity redistribution of the incident light of the display can adapt to a complex image or fast changing images shown by the display. Therefore, the projection system of the present disclosure can provide high contrast images through time. In addition, distribution of the light intensity of the incident light is controlled through algorithm. As such, each color lights from a light source can be redirected towards certain pixels corresponding to the images by algorithm. Therefore, there is no need to use extra optical elements for splitting different color lights, and intensity loss during light transmission can be reduced.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
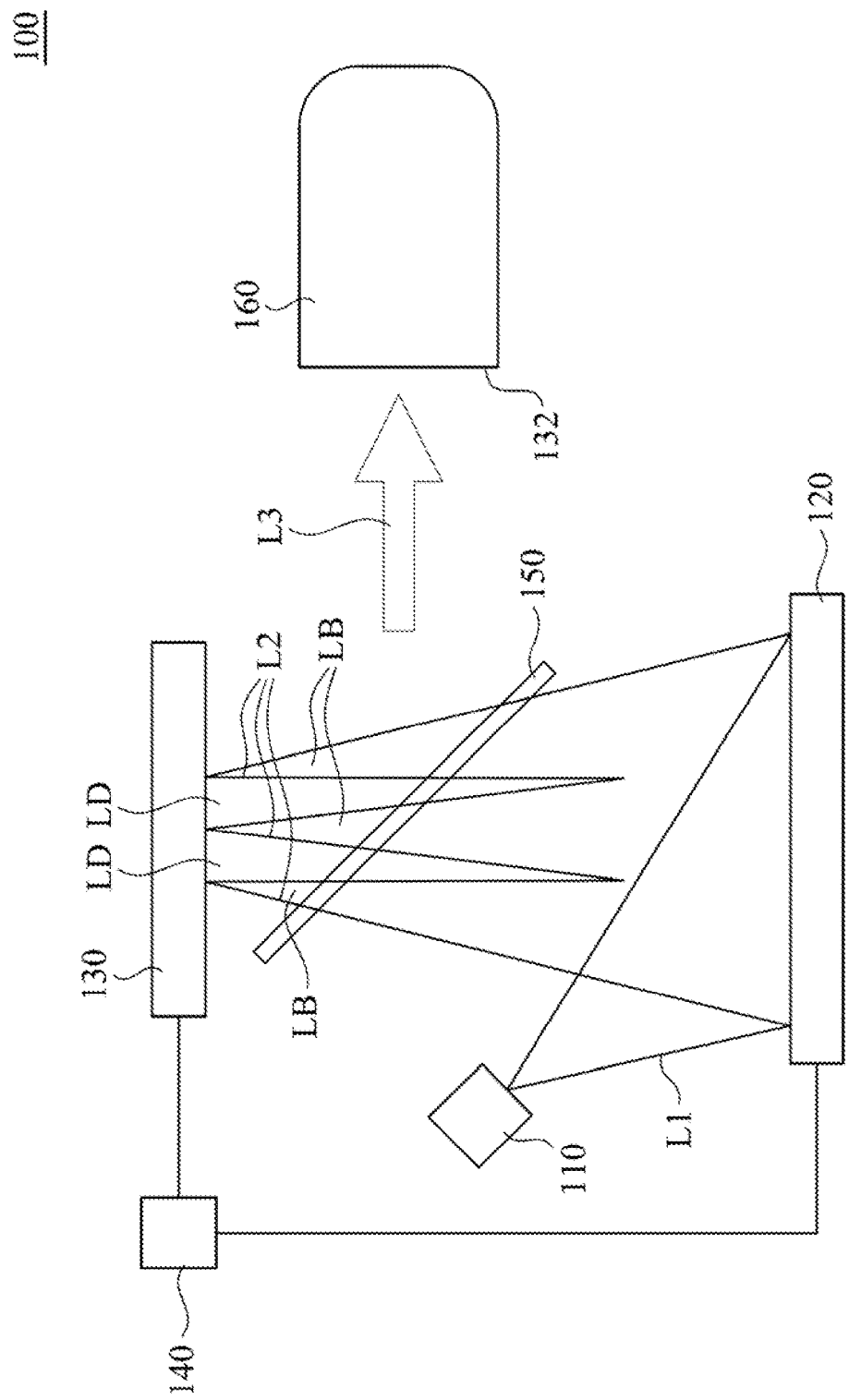
FIG. 1 is a schematic of a projection system according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic of a projection system according to one embodiment of the present disclosure. The projection system 100 includes a light source 110, a LCOS-SLM (Liquid Crystal On Silicon-Spatial Light Modulator) 120, and a display 130. The LCOS-SLM 120 is a reflective spatial light modulator that can modulate light phase. The light source 110 emits a first light L1 towards the LCOS-SLM 120, and the first light L1 is a global light. The LCOS-SLM 120 modulates phase of the global light L1 to form a second light L2. The light intensity distribution of the second light L2 form a pattern that is determined based on the image shown by the display 130.

The light source 110 can be an arc lamp, a laser light source module, or a LED light source. In some embodiments, the light source 110 is a laser light module that emits red light, green light, and a blue light sequentially. In some other embodiments, the light source 110 is a laser light module that emits red light, green light, and blue light simultaneously such that the first light L1 can be considered as an effective white light.

Figure 2:
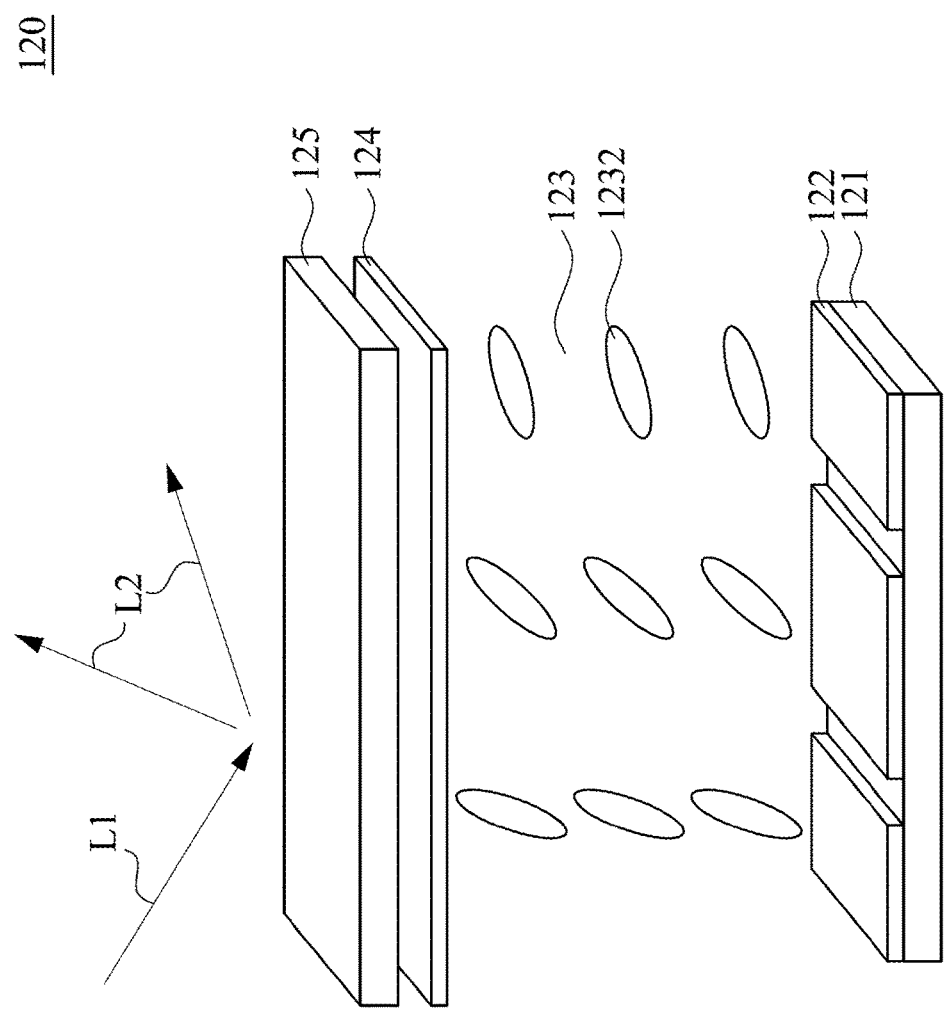
FIG. 2 is a schematic of the LCOS-SLM of the projection system in FIG. 1.

FIG. 2 is a schematic of the LCOS-SLM 120 of the projection system 100 in FIG. 1. The LCOS-SLM 120 includes a backplane 121, several pixel electrodes 122, a liquid crystal layer 123, an electrode layer 124, and a front plane 125. The backplane 121 is a Complementary Metal-Oxide-Semiconductor (CMOS) substrate. The pixel electrodes 122 are disposed on the backplane 121 and are arranged as an array. Three pixel electrodes 122 are demonstrated in FIG. 2. The pixel electrodes 122 include conductive material such as aluminum. The liquid crystal layer 123 is interposed between the backplane 121 and the front plane 125, and the liquid crystal layer contains liquid crystal molecules 1232. The electrode layer 124 is disposed between the liquid crystal layer 123 and the front plane 125. The electrode layer 124 is a transparent conductive layer such as indium tin oxide (ITO). The front plane 125 can be a glass substrate.

A voltage difference between the electrode layer 124 and each of the pixel electrodes 122 may drive the liquid crystal molecules 1232 in the liquid crystal layer 123. The pixel electrodes 122 may reflect the incident light (first light L1). The reflected light (the light L2) passes through the liquid crystal layer 123 and the front plane 125. As such, wavefront of the incident light (first light L1) changes after being reflected and penetrating the liquid crystal layer 123.

Since the LCOS-SLM includes an array formed by the pixel electrodes 122, the liquid crystal molecules 1232 correspond to different pixel electrodes 122 may rotate in different ways. As such, the amount of light penetrating the liquid crystal layer 123 after been reflected can be controlled through the voltage difference between the pixel electrodes 122 and the electrode layer 124. In some embodiments, a width of each pixel electrodes 122 is about 4 um.

Reference is made to FIG. 1. In the present embodiment, the light intensity of the global light L1 is redistributed and becomes a local dimming light (the second light L2) after being modulated by the LCOS-SLM 120. The second light L2 includes several local bright beams LB and several local dim beams LD that are corresponds to the image shown by the display 130. In other words, the second light L2 is the incident light of the display 130.

Figure 3:
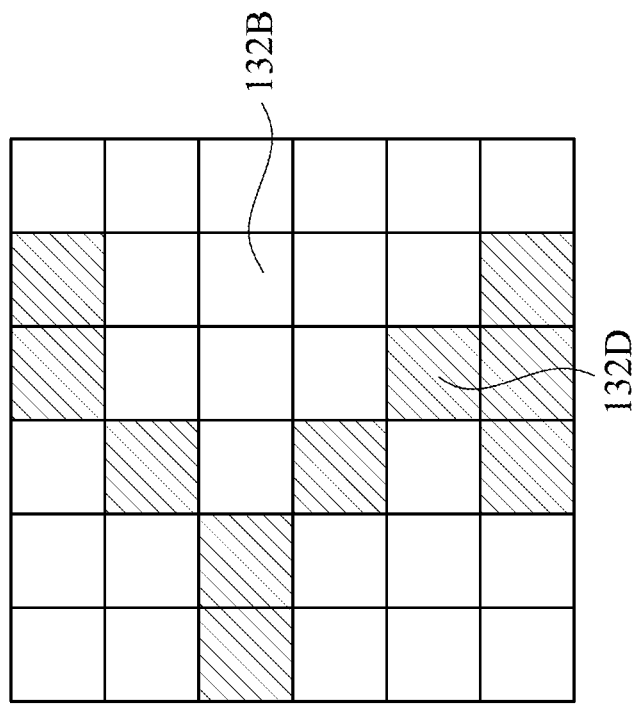
FIG. 3 is a schematic of an image shown by the display in FIG. 1.

FIG. 3 is a schematic of an image 132 shown by the display 130 in FIG. 1. The image 132 includes brighter regions 132B and darker regions 132D. As described above, by modulating the first light L1 so as to form the second light L2 having local bright beams LB and local dim beams LD. The local bright beams LB of the second light L2 may contribute to the brighter regions 132B of the image 132 shown by the display 130. The local dim beams LD of the second light L2 may contribute to the darker regions 132D of the image 132 shown by the display 130. In other words, less diffracted light would propagate to the darker regions 132D of the image 130. Therefore, difference between the darker regions 132D and the brighter regions 132B can be increased such that the image contrast can be improved.

Reference is made to FIG. 1. The projection system 100 further includes a computing unit 140. The computing unit 140 is electrically connected with the LCOS-SLM 120 and the display 130. The pattern of the second light L2 can be controlled by the computing unit 140 based on the images shown by the display 130 in real-time.

Since the LCOS-SLM 120 is a reflective type device, the thickness (i.e. cell gap) is thinner compared to the thickness of a transmittance type device. Therefore, phase modulation rate of the LCOS-SLM 120 is higher such that the light intensity distribution of the second light L2 can adapt to a complex image or fast changing images shown by the display 130. Therefore, the projection system 100 of the present disclosure can provide high contrast images through time.

Distribution of the light intensity of the second light L2 is controlled through algorithm. For example, when the light source 110 includes several color lights emits sequentially, each color light may be redistributed to form a local bright light component and a local dim light component. As such, each color lights can be redirected towards certain pixels corresponding to the images by algorithm. Therefore, there is no need to use extra optical elements for splitting different color lights, and intensity loss during light transmission can be reduced.

Reference is made to FIG. 1. In the present embodiment, the display 130 is a LCOS micro-display, but the present disclosure is not limited hereto. In other embodiments, the display 130 can be Digital Light Processing (DLP) or Liquid Crystal Display (LCD). The projection system 100 further includes a polarizer 150 and a projection lens 160. In the present embodiment, the polarizer 150 is a wire grid polarizer, but the present disclosure is not limited hereto. In other embodiments, the polarizer 150 may be a polarizing beam splitter (PBS). The polarizer 150 is arranged between the LCOS-SLM 120, the display 130, and the projection lens 160. The image shown by the display 150 can be projected on to a screen through the projection lens 160.

The wire grid polarizer includes several fine metal wires on a substrate with specific pitch according to the wavelength of an incident light (in this case, the second light L2). In the present embodiment, the second light L2 after been modulated by the LCOS-SLM 120 is divided into two portions with different polarization states such as a P-polarized beam and a S-polarized beam. The P-polarized beam may transmit through the polarizer 150, and the S-polarized beam may be reflected by the polarizer 150. The P-polarized beam may be converted into S-polarized beam and transmit towards the polarizer 150 again. Therefore, this S-polarized beam (third light L3) from the display 130 can be reflected by the polarizer 150 and then be directed towards the projection lens 160.

Alternatively speaking, the projection system 100 can be considered as a light source module combined with a computing unit 140 and a micro-display 130. The light source module is configured to provide an incident light (the second light L2) for the micro-display. The light source module includes a light source 110 configured to emit a first light L1, and a LCOS-SLM 120 is configured to modulate phase of the first light L2 to form the incident light (the second light L2).

In summary, since the incident light of a display is modulated by a LCOS-SLM, the incident light can be redistributed to form local bright beams and local dim beams. As such, less diffracted light would propagate to a darker region of the image shown by the display. Therefore, image contrast can be improved. Since the LCOS-SLM is a reflective type device, phase modulation rate of the LCOS-SLM is higher. As such, the light intensity distribution of the incident light of the display can adapt to a complex image or fast changing images shown by the display. Therefore, the projection system of the present disclosure can provide high contrast images through time. In addition, the light intensity distribution of the incident light is controlled through algorithm. As such, each color lights from a light source can be redirected towards certain pixels corresponding to the images by algorithm. Therefore, there is no need to use extra optical elements for splitting different color lights, and intensity loss during light transmission can be reduced.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A projection system, comprising:
   a light source configured to emit a first light;
   a reflective phase modulator configured to modulate phase of the first light to form a second light;

a display configured to receive the second light;
a projection lens, wherein the display is located between the projection lens and the reflective phase modulator; and
a computing unit electrically connected to the reflective phase modulator and the display, wherein the computing unit is configured to control a pattern of the second light based on an image displayed by the display in real-time before the second light entering the display, and the pattern of the second light comprises a plurality of local dim beams and a plurality of local bright beams.

2. The projection system of claim 1, wherein the reflective phase modulator is a LCOS-SLM.

3. The projection system of claim 1, wherein the display is a micro-display.

4. The projection system of claim 3, wherein the display is a LCOS display.

5. The projection system of claim 1, wherein the computing unit is configured to control the phase modulation of the reflective phase modulator.

6. A projection system, comprising:
a light source module configured to provide an incident light, wherein the light source module comprises:
a light source configured to emit a first light; and
a LCOS-SLM configured to modulate phase of the first light to form the incident light, wherein the incident light comprises a plurality of local dim beams and a plurality of local bright beams;
a computing unit configured to control the light intensity distribution of the local dim beams and the local bright beams of the incident light; and
a micro-display configured to receive the incident light, wherein the computing unit is electrically connected to the LCOS-SLM and the micro-display, and the computing unit is configured to control the light intensity distribution of the local dim beams and the local bright beams based on an image displayed by the display in real-time before the incident light entering the micro-display.

* * * * *